United States Patent Office 3,311,205
Patented Mar. 28, 1967

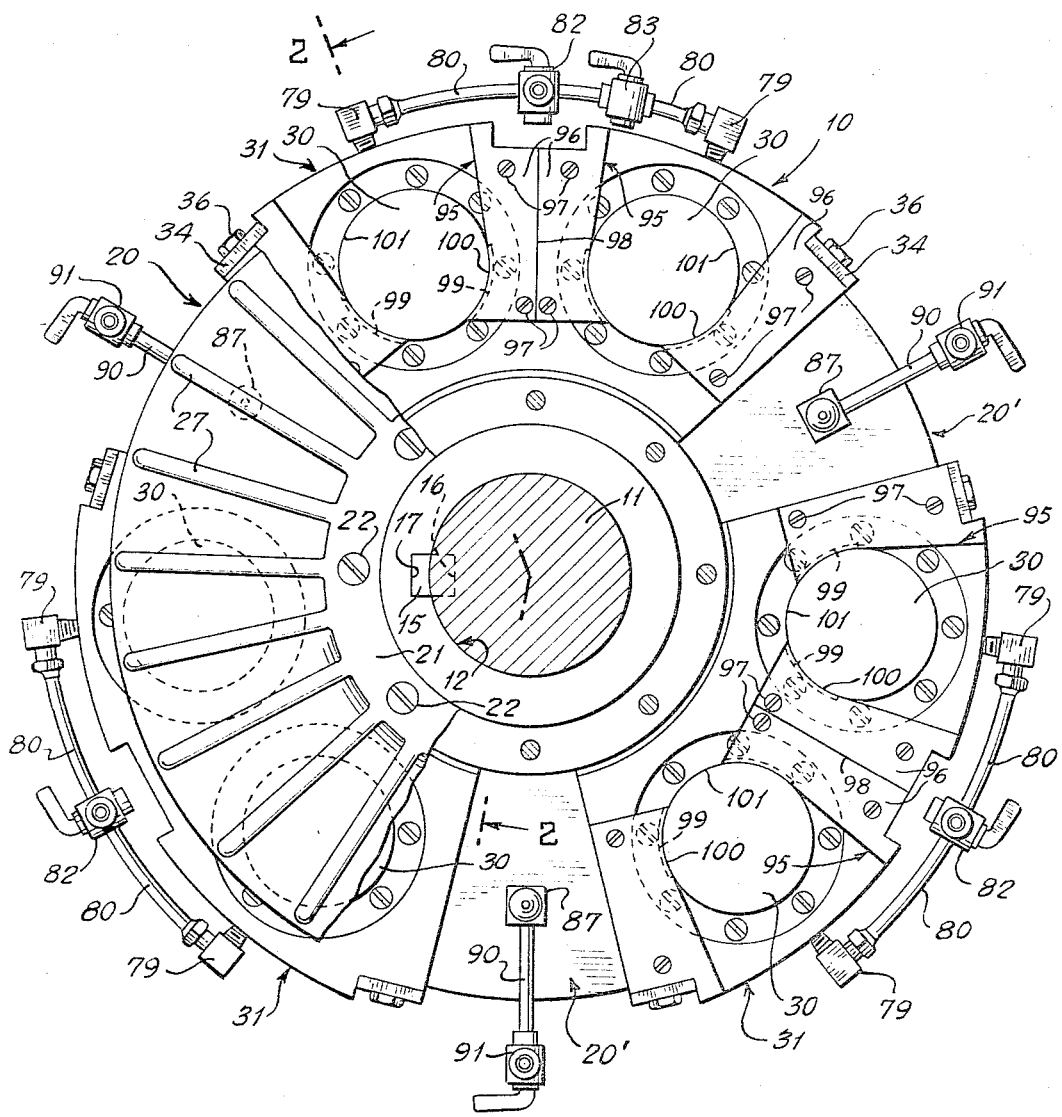

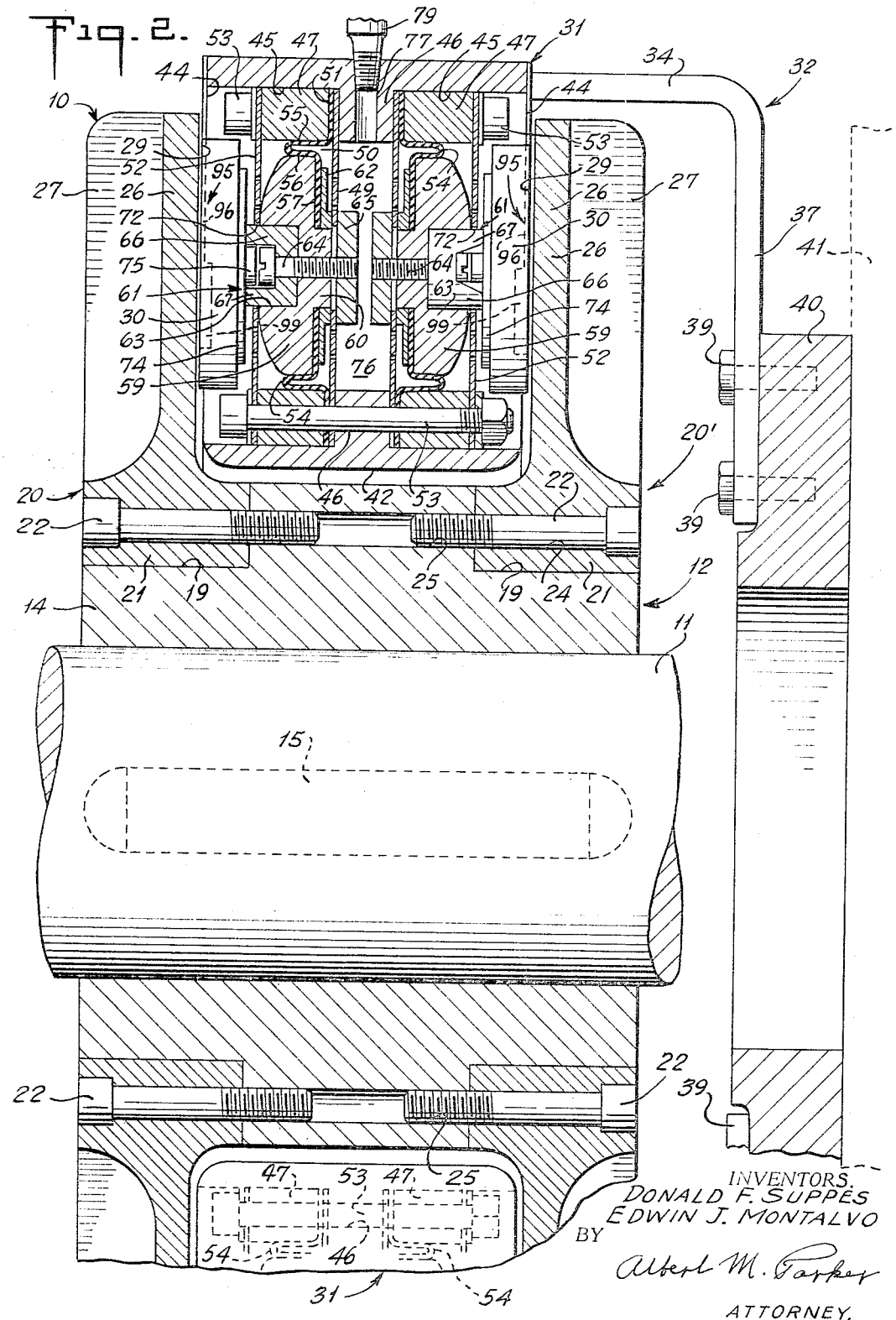

3,311,205
FRICTION COUPLING MECHANISM
Donald F. Suppes, Wyckoff, and Edwin J. Montalvo, Hackensack, N.J. (both % Montalvo & Co., Inc., 379 Union St., Hackensack, N.J. 07606)
Filed Feb. 15, 1966, Ser. No. 527,578
6 Claims. (Cl. 192—70)

This application is a continuation-in-part of application Ser. No. 302,169, filed Aug. 14, 1963, now Patent No. 3,237,738.

This invention relates to a friction coupling mechanism. The invention includes within its scope brakes, wherein a rotatable element is selectively frictionally coupled to a relatively non-rotatable element, and clutches, wherein two rotatable elements are selectively coupled and uncoupled. The mechanism in accordance with the invention is illustrated herein by an embodiment thereof in the form of a brake for a rotatable shaft.

The present invention represents an improvement upon the invention disclosed and claimed in the above-referred-to application Ser. No. 302,169, which is incorporated herein by reference in its entirety. The present invention is particularly concerned with an improved guide means for the frictional members or pad means of the friction coupling mechanism, whereby the frictional members or pads are more securely guided between their inoperative and operative positions, and the thrust reactions upon the frictional members or pads are more efficiently absorbed or compensated for than in the prior structure.

The invention has among its objects the provision of a novel frictional coupling mechanism.

A further object of the invention lies in the provision, in a frictional coupling mechanism wherein frictional members or pads are selectively advanced into engagement with or retracted from a confronting member with which it is designed to have selective driving and/or braking relationship, of improved means for guiding such frictional members and for absorbing the torque reaction therefrom resulting from engagement of such members with the confronting member.

In the drawings, wherein like reference characters refer to like parts throughout the several views, FIG. 1 is a view in front elevation of the mechanism of the invention, the shaft to which the mechanism is connected being shown in transverse section, a part of the friction plate nearer the reader in the figure being broken away; and FIG. 2 is an enlarged view in section through the mechanism of FIG. 1, the section being taken along the broken section line 2—2 of FIG. 1.

In the drawings, FIGS. 1 and 2 correspond generally to FIGS. 2 and 3, respectively, of application Ser. No. 302,169. With the exception of the added guides for the frictional members or pads, the reference characters employed in FIGS. 1 and 2 herein are the same as those employed in FIGS. 2 and 3 in the parent application.

As above indicated the friction coupling mechanism of the invention may be employed either as a brake or as a clutch. The embodiment of mechanism illustrated herein is adapted to function as a brake. In the embodiment shown, the brake generally designated by the reference character 10, is adapted selectively frictionally to couple a rotatable shaft 11 to a non-rotatable member 40 so as to bring the shaft 11 to a stop and to retain it from rotation. The mechanism 10 includes a rotor 12 which is affixed to shaft 11 in a manner shown in FIGS. 1 and 2.

Rotor 12 has an annular sleeve-like hub 14 which is secured to shaft 11 to rotate therewith by means of a key 15 which is disposed in a groove 16 in the shaft and a keyway 17 in the hub of the rotor. The hub 14 of rotor 12 has an annular seat 19 on each side thereof, each seat accurately receiving the inner thickened edge 21 of a respective one of the two similar friction plates 20, 20'. The friction plates are securely held on hub 14 and maintained against rotation with respect thereto by a plurality of studs 22 which extend inwardly through angularly spaced bores 24 in the inner edge portion 21 of each plate 20, 20' and are screwed into a threaded passage 25 in the hub 14.

The outer portion 26 of each plate 20, 20' is somewhat thinner than portion 21 thereof, portion 26 having a plurality of radially directed cooling fins 27 integrally attached to the outer face of the plate. The inner face 29 of each plate 20, 20' is flat, annular, and lies in a plane transverse to the axis of the shaft 11. The friction coupling mechanism 10 in the illustrative embodiment thereof includes a plurality (six shown) of opposed pairs of friction members 30 in the form of discs which are mounted on a body which is fixed from rotation relative to shaft 11, friction members 30 being selectively forcibly thrust outwardly into contact with the respective faces 29 of the opposed plates 20, 20'.

As shown in FIGS. 1 and 2, two pairs of opposed friction members 30 are mounted in each of three similar sector-shaped bodies 31 which are disposed coaxially of the shaft 11 and rotor 12 and are spaced at equal angles from each other. Each of the bodies 31 is supported on the above mentioned member 40 by means of two rigid L-shaped brackets or hangers 32. Each bracket 32 has an arm 34 extending parallel to shaft 11, the outer end of arm 34 being received within a groove in the outer face of the respective body 31 and secured thereto by studs 36. The radially extending arm 37 of each bracket 32 is secured to member 40 by studs 39. The member 40 may have a central passage therethrough, as shown, to receive shaft 11 therethrough should such be desired. Member 40, in turn, is secured to a fixed structure generally designated 41 (FIG. 2); member 41 may be, for example, a part of the frame of the apparatus with which the brake 10 is used. The brackets 32 hold the bodies 31 so that the side faces 44 of the latter are in alignment transverse to the axis of shaft 11 and are spaced a short distance inwardly from the inner face 29 of the respective friction plate 20, 20'. The radially inner surfaces 42 of bodies 31 are spaced radially outwardly somewhat from the root of body 12 between flange members 26.

Each of bodies 31 is provided with two angularly spaced sets of opposed fluid operated reciprocating motors of the diaphragm type which thrust the friction members 30 against the faces 29 of plates 20, 20'. The construction of such motors is most clearly shown in FIG. 2. As there shown, the body 31 has a bore 45 therein extending inwardly from each side surface of the body to a relatively axially thick central radially inwardly directed flange 46. An annular body 47 accurately fits within each bore 45, body 47 functioning to thrust the radially outer edge of an axially inner flat spring member 49 and the outer edge 51 of a rubber-like diaphragm 50 lying axially outwardly of spring 49 together and against the annular side surface of flange 46. The radially outer edge of a second, outer flat spring member 52, which is similar to member 49, overlies the axially outer face of member 47. The two similar reciprocating fluid motors thus formed have the parts thereof held together by a plurality of equally angularly spaced bolts 53 which extend in that order from the left to the right in FIG. 3 through passages in the outer edge of spring 52, member 47, flange 51 of diaphragm 50, the outer edge of spring 49, the flange 46 and the radially outer parts of the other, opposed similar motor in the reverse order from that above given for the first motor. Bolts 53 are secured by nuts on the right-hand ends thereof, as shown.

The diaphragm 50 has a rounded annular fold 54 which is open in an axially inwardly direction. The outer side wall 55 of the diaphragm adjacent fold 54 and the inner side wall 56 thereof lie generally parallel to and radially spaced from each other. An annular plunger body 59 fitting with the inner side wall 56 of the diaphragm is disposed in bore 45 coaxial thereof and is maintained in such position by the above mentioned flat spring members 49 and 52. Plunger body 59 is made of non-magnetic material such as aluminum. Beyond the inner wall 56 the diaphragm 50 continues in a radially inwardly extending annular flange portion 57 which overlies and sealingly engages the radially outer annular axially inner surface of plunger body 59. The plunger body 59 has a central axially extending boss 60 which extends through a central hole in the flange 57 of the diaphragm 50.

The axially outer end of plunger body 59 is provided with a circular cylindrical seat 63 within which there is received a permanent magnet 61, which may be made, for example, of "Alnico." The magnet 61 has a shape which is most clearly shown at the upper right in FIG. 2. The inner end of the magnet is in the form of a thick-walled circular cylindrical sleeve. The forward end of magnet 61, which has spaced opposite poles 66 and 67 of opposed magnetic polarity, extends through and closely fits within a central hole 72 in the flat spring 52. The motor plunger assembly is completely by a stepped washer 62 which lies between the inner flat spring member 49 and the inner flange 57 of the diaphragm 50 with the broader portion thereof in contact with the flange of the diaphragm, a bolt or screw 64, made of non-magnetic material such as brass, which extends through the axial passage in magnet 61 and has its head received within a central seat in the magnet between the opposed holes thereof, and a nut 65, the radially outer edge of which overlies the inner edge of the flat spring member 49.

The flat springs 49 and 52, which are made of non-magnetic material such as a conventional resilient beryllium-copper alloy, maintain the plunger body 59 in the retracted position shown in FIG. 2 when the chamber 76 between the inner ends of the opposed motors is subjected only to atmospheric pressure. When, however, chamber 76 is subjected to appreciable fluid pressure by being connected to a source of compressed air, the plunger body 59 is thrust axially outwardly so as strongly to force its friction element 30 against the confronting face 29 of its respective friction plate 20, 20'.

The flat spring members 49 and 52, which may be of identical construction, each have a central opening 72 therethrough. Each plate has a plurality of holes spaced radially outwardly from hole 72 and spaced angularly at 90° from each other. From each of such angularly spaced holes there extends a first chordally disposed slot and a second chordally disposed slot at right angles to the first slot, each second slot lying intermediate a first slot from an adjoining one of the angularly spaced holes and the central hole 72 through the flat spring member. As a result of such construction, the central part of the disc is, in effect, supported by four equally angularly spaced fingers which connect it to the outer peripheral portion of the spring member. Thus the central portion of the spring member may yield appreciably in an axial direction with respect to the outer peripheral portion thereof.

The friction element 30 has a disc member 74 with a central boss 75 affixed thereto, the disc and boss both being made of magnetic metal. The boss 75 has a diameter such that it is received within the seat provided between the poles 66 and 67 of the magnet and the head of the bolt 64, with at least a slight freedom of radial and angular movement with respect to the magnet. The magnet 61 thus retains the friction element securely in place while permitting it to adjust itself slightly as may be required as the friction element wears.

Fluid flows between the chamber 76 and the inner surface of each of the diaphragms 50 of the opposed fluid motors in each pair thereof through the angularly spaced holes and the first and second slots in the flat spring members 49 of each of the motors. The chamber 76 between the inner ends of each pair of opposed motors is supplied with fluid under pressure through a passage 7 extending radially through the flange 46. A fitting 79 is screwed into the outer end of passage 77. The fittings 79 of the two chamber 76 in each body 31 are connected by a cross-pipe 80 to which a branch supply pipe (not shown) is connected. As disposed in application Ser. No. 302,169, each branch supply pipe is connected to a manifold or bustle pipe through a shut-off valve 82. The manifold, in turn, is supplied with fluid under pressure from a source, not shown, through a main supply pipe provided with a main control valve. When the valves 82 are suitably manipulated, two, four, or six of the opposed pairs of fluid motors of the mechanism 10 may be operated when the main control valve is opened. In order to permit the operation of the mechanism 10 with any number from one to six of the opposed pairs of fluid motors in operative condition, there is provided a shut-off valve 83 in the branch line 80 leading to one pair of fluid motors, whereby such one opposed pair of fluid motors may be selectively made to be operative or inoperative.

Preferably the mechanism 10 is provided with cooling means for plates 20 in addition to the above mentioned cooling fins 27 thereon. Such cooling means takes the form of three double-ended nozzles 87, one of which is located in each of the spaces between the confronting radial end surfaces of the successive bodies 31.

Each end of the nozzle body is provided with a nozzle opening. The nozzle body is provided with fluid under pressure such as compressed air, such fluid being discharged through the nozzle openings against the inner faces 29 of the plates 20. A convenient and preferred manner of supplying nozzles 87 with fluid is illustrated in FIG. 1, wherein the pipe 90 which supplies each double-ended nozzle 87 is connected to the manifold through a manually operated shut-off valves 91 are opened, the opening of the main control valve not only supplies fluid under pressure to the chamber 76 of each operative pair of opposed fluid motors, but also causes cooling fluid to be discharged from the nozzles 87 against the friction plates 20, 20', as described.

In accordance with the present invention, there is provided a positive means for guiding the pressure or friction members 30, and for opposing the torque reaction between such members 30 and the body 31. As shown in FIGS. 1 and 2, there is provided on each of the segments 31 a pair of guide members 95, the members 95 of each pair being of reverse configuration. Thus each member 95 has a flat body portion 96 which is attached by studs 97 to the respective segments of body 31. The members 95 forming a cooperating pair thereof abut along their straight edges 98 when mounted in operative position, as shown.

The members 95 forming a cooperating pair of guide members are positioned on opposite sides of each of the pressure or friction members 30, as shown in FIG. 1. Such members 95 of each pair are provided with curved flanges 99 which extend outwardly toward the reader in FIG. 1 and axially inwardly in FIG. 2. The opposing members 95 of each pair thereof have the inner surfaces 100 thereof lying on a cylinder which substantially coincides with the circular cylindrical peripheral surface 101 of the respective pressure or friction member 30. Thus the flanges 99 of each cooperating pair of guide members form an accurate bearing for its pressure member 30, such bearing aiding the flat diaphragm springs 49 and 52 in maintaining the pressure members 30 normal to the portions 26 of the plates 20, 20' and in resisting the torque thrust imposed upon such pressure members by portions 26 of plates 20, 20' when the pressure members are advanced into forceful engagement with the plates.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A mechanism for selectively frictionally coupling two relatively rotatable bodies, comprising two parallel friction plates fixedly connected to a first one of said bodies transverse to the axis of relative rotation of said bodies, means connected to the second of said bodies and carrying at least two sets of separate friction members, the friction members of one of said sets being angularly spaced about, and spaced radially outwardly of, said axis, and confronting a face of one of the friction plates, the friction members of the other of said sets being angularly spaced about, and spaced radially outwardly of, said axis, and confronting a face of the other of the friction plates, means for simultaneously thrusting the friction members into contact with the faces of the friction plates which they confront, and means on the second of said bodies for positively engaging and guiding the friction members for travel toward and away from the friction plates.

2. A mechanism as claimed in claim 1, wherein the friction members are opposed and confront the axially inner faces of the respective friction plates, and the means for thrust the friction members thrust them in opposite directions.

3. A mechanism as claimed in claim 2, wherein the second body has a portion positioned between the inner faces of the friction plates, and wherein the friction members are mounted on said portion of the second body.

4. A mechanism as claimed in claim 1, comprising means for retaining the friction members retracted from the friction plates when the thrust means for the friction members are deenergized.

5. A mechanism as claimed in claim 1, wherein said means on the second of said bodies for positively engaging and guiding the friction members comprises similar but oppositely disposed guide members each having a flat plate portion secured to the second of said bodies and guide portions confronting and engaging opposite sides of the respective friction member.

6. A mechanism as claimed in claim 5, wherein the guide portions of the guide members are formed of flange portions bent up out of the bodies of the guide members and disposed substantially normal to the flat bodies of the respective guide members.

References Cited by the Examiner

UNITED STATES PATENTS

| 2,104,472 | 1/1938 | Airman | 192—70 X |
| 2,422,159 | 6/1947 | Wood | 192—85 |
| 2,785,781 | 3/1957 | Johnson | 192—88 X |
| 2,869,702 | 1/1959 | Hindmarch | 192—85 |
| 2,885,031 | 5/1959 | Hindmarch | 192—85 X |
| 2,956,650 | 10/1960 | Wilson | 192—113 X |
| 2,997,138 | 8/1961 | Cagle | 188—73 |
| 3,063,532 | 11/1962 | Jaeschke | 192—113.2 |
| 3,112,014 | 11/1963 | Jeffries | 188—73 |

FOREIGN PATENTS 947,130    8/1956    Germany.

DAVID J. WILLIAMOWSKY, *Primary Examiner.*

A. T. McKEON, *Assistant Examiner.*